United States Patent [19]
Pearce et al.

[11] Patent Number: 5,445,382
[45] Date of Patent: Aug. 29, 1995

[54] GOLF CLUB HEAD OF ENTANGLED FIBER REINFORCED PLASTIC

[75] Inventors: Terry V. Pearce, Sandy; Tony M. Pearce, Alpine, both of Utah

[73] Assignee: Edo Sports, Inc., Salt Lake City, Utah

[21] Appl. No.: 9,450

[22] Filed: Jan. 26, 1993

[51] Int. Cl.$^6$ ............................................. A63B 53/04
[52] U.S. Cl. ........................ 273/167 R; 273/167 J; 273/167 A; 273/DIG. 7; 273/DIG. 23; 273/78
[58] Field of Search ............ 273/167 R–177 A, 273/73 F, 72 R, 57.2, 67 R, DIG. 7, DIG. 23, DIG.3, DIG. 9; 264/108, 258

[56] References Cited

U.S. PATENT DOCUMENTS

| | | | |
|---|---|---|---|
| 1,864,513 | 6/1932 | Balch | 273/174 |
| 3,547,445 | 12/1970 | Hardesty | 273/173 |
| 4,114,880 | 9/1978 | Cecka | 273/73 F |
| 4,591,155 | 5/1986 | Adachi | 273/DIG. 7 |
| 4,630,826 | 12/1986 | Nishigaki | 273/173 |
| 4,664,383 | 5/1987 | Aizawa | 273/DIG. 7 |
| 4,687,205 | 8/1987 | Tominaga | 273/169 |
| 4,725,059 | 2/1988 | Gardin | 273/73 F |
| 4,754,975 | 7/1988 | Aizawa | 273/169 |
| 4,793,616 | 12/1988 | Fernandez | 273/169 |
| 4,883,623 | 11/1989 | Nagamoto | 273/167 R |
| 5,100,144 | 3/1992 | Okumoto | 273/167 J |

FOREIGN PATENT DOCUMENTS

| 2124911 | 2/1984 | United Kingdom | 273/173 |
|---|---|---|---|

*Primary Examiner*—Sebastiano Passaniti
*Attorney, Agent, or Firm*—Thorpe North & Western

[57] ABSTRACT

A structure and method for producing golf club heads from fiber reinforced plastic is described. A long fiber reinforced thermoplastic material is used to injection mold the golf club head. The long fiber reinforced thermoplastic material provides three-dimensional strength and stiffness. The long fiber reinforced thermoplastic material is injected into a mold so that the fibers become entangled with each other. Entangled fibers provide increased strength and stiffness in more than a single direction. A sole plate and face plate are also provided. Because of the strength and rigidity of the material used to fabricate the golf club head, the face plate may be fabricated from materials not otherwise useable. A flexible thermoplastic foam block is positioned in the interior of the golf club head to prevent rattle and to provide a realistic wood sound when hitting a golf ball. The sole plate includes a hole formed therein at an appropriate location and a clear plastic window is positioned in the hole so that the cosmetically desirable characteristic of viewing the end of the golf club shaft through the bottom of the golf club when the shaft is installed can be readily obtained. The golf club head has the desirable characteristics of heads made from traditional materials with the advantages obtainable using plastic without the heretofore unavoidable disadvantages of low strength and stiffness encountered previously when using plastic materials.

23 Claims, 2 Drawing Sheets

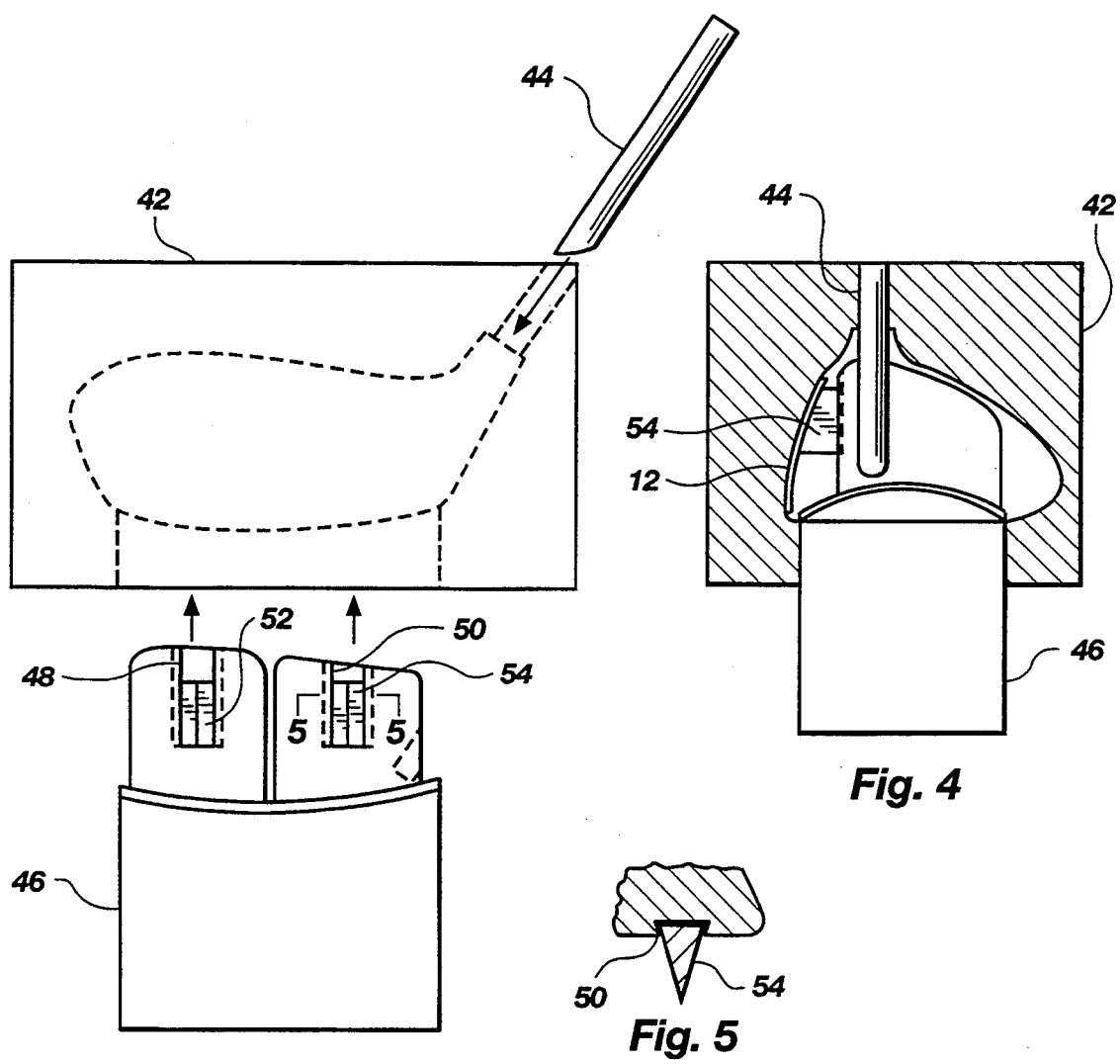
Fig. 4
Fig. 5
Fig. 3
Fig. 6
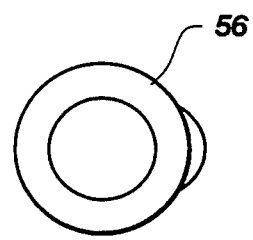
Fig. 7

GOLF CLUB HEAD OF ENTANGLED FIBER REINFORCED PLASTIC

BACKGROUND

1. The Field of the Invention

This invention relates to sporting goods fabricated from fiber reinforced plastics. More particularly, the present invention relates to improved structures for, and materials and methods of fabricating, golf club heads.

2. The Background Art

The continuing increase in the popularity of the sport of golfing has motivated extensive research and development into improving the fabrication of golf clubs. While golf club heads have traditionally been fabricated from either metal or wood materials, hence the designation "irons" and "woods," modern materials provide significant advantages over these traditional materials.

Among the modern materials which have become popular for the fabrication of golf club heads is fiber reinforced plastic. In many cases, it has become common for one manufacturer to fabricate the golf club head while the club head is assembled to a golf club shaft by another party. Fiber reinforced plastic materials provide several advantages over traditional materials but have also presented several drawbacks.

Several techniques have been used in the art to fabricate golf club heads. Such techniques include compression molding (including lay up, sheet molding compound, and bulk molding compound techniques), resin transfer molding, and injection molding.

In all of these techniques, the material to be molded is inserted into a cavity mold and pressure is applied to force the material against the wall of the cavity. In order to increase the strength of the finished golf club head, fibers can be added to the resin used to form the golf club head. Still, all of these techniques and materials have serious drawbacks.

In compression molding using continuous fiber layup, unidirectional tape and/or woven fabric is embedded in an uncured (still fluid) thermoset resin. The fibers are laid in the mold so that the fibers are aligned parallel to and along the mold cavity walls. While this arrangement imparts high strength in the direction of the fibers, it provides very low strength in the direction perpendicular to the direction of the fibers. Thus, the finished golf head has high strength in one plane or direction but very low strength in a direction oriented perpendicular to the plane. Disadvantageously, when the golf club head experiences the repeated high impact loads associated with striking a golf ball and/or the ground, this lack of strength in other than the direction of orientation of the fibers can cause structural failure, including cracks or delaminations between layers of tape and/or fabric, and results in poorer performance of the golf club head.

In compression molding using sheet molding compound, relatively short fibers are suspended in a viscous thermoset resin and are pressed into flat sheets. The flat sheets are placed in the mold cavity. The fibers in the sheet generally are unidirectional and during the molding process the fibers are forced into an alignment parallel with the mold cavity walls. Virtually no fibers are aligned in a direction perpendicular to the mold cavity wall resulting in a lack of strength in the direction perpendicular to the direction of the fibers. Thus, the resulting golf club head has less than desirable strength and stiffness characteristics and results in loss of performance.

In compression molding using bulk molding compound, very short fibers are formlessly suspended in a viscous thermoset resin. Because of the flow of the material during molding, the short fibers align themselves in the direction of the cavity mold wall. Disadvantageously, this results in a weak finished golf club head in any plane because of the very short fibers which are used.

In the resin transfer molding technique, tape and/or woven fabric containing unidirectionally oriented fibers, without resin, is laid into the mold cavity parallel to the mold wall. The mold is closed and thermoset resin is forced into the mold and into the fiber tape/fabric under pressure resulting in no reinforcing fibers being oriented in a direction perpendicular to the cavity wall. Hence, the inherently weak structure may fail during use or lack the stiffness needed for suitable performance.

In the injection molding technique, a single mold can produce high volumes of parts with low labor cost per part when compared to the other plastic golf club head fabrication techniques. Generally, injection molding techniques use thermoplastic, in contrast to thermosetting, materials into which fibers are mixed. During the mixing and injection procedure, the fiber length is reduced due to cutting and breaking and the fibers tend to align in a single direction. The thermoplastic material provides the advantage of being much tougher and less brittle than thermoset resins. Still, the finished golf club head often has significant strength in only one direction. Moreover, golf club heads made using these techniques suffer from problems such as the sole plate screws pulling out from the golf club head material.

It will be appreciated that these described techniques produce golf club heads which do not have high strength and high stiffness in all directions. Low stiffness prevents the incorporation of certain advantageous non-structural or semi-structural features into golf club heads. For example, golf club heads often have face plates inserted into the club head face to provide good appearance and/or higher stiffness and/or increased hardness.

An additional problem with customary injection molding of golf club heads is maintaining the positioning of a face plate within the mold as the molten plastic is injected at high pressure. The forces from the viscous, flowing plastic tend to move the face plate from its desired position. The more flexible the face plate, the more this problem is exacerbated making it difficult to use face plates, especially very thin face plates which are installed for appearance only.

A still further problem with golf club heads fabricated with these described techniques involves "bore-through" shafts. It is desirable to have the cylindrical shaft-receiving cavity be continuous through to the sole of the golf club head so that the bottom of the golf club shaft, when installed, can be viewed through the sole. While this is cosmetically desirable, it presents a difficulty when golf club heads are assembled to golf club shafts. The attachment of a golf club shaft in a bore-through fashion requires that the area of the sole plate at which the shaft cavity opens must be refinished after the club is assembled and usually the entire golf club head must be refinished requiring substantial additional labor.

A further drawback inherent with golf club heads fabricated using these prior techniques is that a foam core which is included in such golf club heads shrink and become loose with age cause a rattling sound when the golf club is used. While the foam core is included to prevent rattle or alter the sound of the club head hitting a golf ball, when the foam core becomes loose it is unsatisfactory and generally results in the golf club being discarded.

In view of the foregoing problems and disadvantages, it would be an advance in the art to provide an improved fiber reinforced golf club head which provides the strength and rigidity needed to provide long and satisfactory service.

BRIEF SUMMARY AND OBJECTS OF THE INVENTION

In view of the above described state of the art, the present invention seeks to realize the following objects and advantages.

It is an object of the present invention to provide a fiber reinforced plastic sporting goods article possessing strength and rigidity in a plurality of planes or directions and which resists breakage during extensive use.

It is also an object of the present invention to provide a fiber reinforced plastic golf club head which exhibits strength in planes which are both perpendicular and non-perpendicular to the face and other surfaces of the golf club head and which resist fracturing when repeatedly striking a golf ball.

It is another object of the present invention to provide a fiber reinforced plastic golf club head which is fabricated from a tough material which will not fail during use.

It is still another object of the present invention to provide an improved fiber reinforced plastic golf club head which can be injection molded.

It is a further object of the present invention to provide a fiber reinforced plastic golf club head wherein the reinforcing characteristics of the fibers are greater than other golf club heads.

It is yet another object of the present invention to provide a fiber reinforced plastic golf club head which is fabricated from either thermoset or thermoplastic materials.

It is a further object of the present invention to provide a fiber reinforced plastic golf club head wherein non-structural and semi-structure inserts can be included at the face of the golf club.

It is another object of the present invention to provide a fiber reinforced plastic golf club head which facilitates assembly of golf club heads and golf club shafts with the end of the shaft showing through the sole of the finished golf club head.

It is yet another object of the present invention to provide a method of filling the interior of a golf club head with a foam which is durable, flexible, and long lasting for the purpose of altering the sound made by striking a golf ball and for the purpose of preventing rattles.

These and other objects and advantages of the invention will become more fully apparent from the description and claims which follow, or may be learned by the practice of the invention.

The present invention provides both a structure and a method for producing sporting articles having a striking plane which receives the force of an object struck by the article when swung. For example, baseball bats, softball bats, and other sporting goods can benefit from the present invention. The present invention is particularly suited to the fabrication of golf club heads.

Of particular importance to gaining the advantages of the present invention is the material and method used to fabricate the embodiments of the present invention. It is preferred that a long fiber reinforced thermoplastic material be used. The long fiber reinforced thermoplastic material provides three dimensional and stiffness which has heretofore been unrecognized as important in art. It in order to obtain the advantages of the present invention, the method of fabricating the structure must be carried out so that when the long fiber reinforced thermoplastic material is injected into a mold the fibers become entangled. Entangled fibers provide increased strength and stiffness in more than just one or two directions, as was the case in prior materials. The structure and method described herein is particularly suited for use in fabricating golf club heads.

In fabricating the preferred golf club heads, a thermoplastic material is molded in the shape of a golf club head using a thermoplastic material. A plurality of reinforcement fibers are dispersed in the thermoplastic material. Substantially all of the reinforcement fibers having a length of at least about four millimeters and being oriented in all directions including directions substantially perpendicular to the striking face of the golf club head, substantially perpendicular with the surface of the golf club head (and with the wall of the mold used to fabricate the golf club head), and other fibers oriented in other directions which are nonperpendicular to the striking face of the golf club head.

Also included with the preferred golf club head is a means for receiving a golf club shaft, means for receiving a sole plate, and optional means for receiving a face plate. The face plate may preferably be fabricated from fiber reinforced plastic, ceramic, or some other material. A face plate positioning means is used to hold the face place in position and to provide structural strength and rigidity.

It is also preferred that a thermoplastic foam core be positioned in the hollow interior portion of the golf club head shell to prevent unwanted noises and rattles and to alter the sound made when striking the ball.

In order to facilitate allowing the cosmetically desirable characteristic of viewing the end of the golf club shaft through the bottom of the golf club head, the sole plate includes a hole formed therein at the appropriate location and a clear plastic window positioned in the hole.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which:

FIG. 3 represents a front elevational view of an injection mold and apparatus used during the molding process of the golf club head illustrated in FIG. 1.

FIG. 4 represents a side elevational view of the injection mold and apparatus indicated in FIG. 3.

FIG. 5 is a cross sectional top view of a face plate positioner preferred for use in the golf club heads of the present invention.

FIG. 6 is a front elevational view of a sole plate preferred for use with the golf club heads of the present invention and the window which is inserted into the hole provided in the sole plate.

FIG. 7 is an end view taken along line 7—7 of FIG. 6 showing the plastic window represented in FIG. 6.

DETAILED DESCRIPTION OF THE PREFERRED EMBODIMENTS

Reference will now be made to the drawings wherein like structures will be provided with like reference designations.

Fiber reinforced plastics have for some time been recognized as having potential uses in various sporting goods, such as golf club heads, as evidenced by the many fabrication techniques outlined above. The industry, however, still has not completely recognized the problem of products fabricated using such materials and techniques exhibiting low strength or stiffness only in one direction or plane. Moreover, even if the problem of low strength has been recognized in one application or another, a suitable solution has not previously been found in the art.

It will be understood that many different applications can benefit from the present invention. In order to most clearly explain the present invention, one presently preferred embodiment of the present invention, a golf club head, will be described in detail. It will be understood that the teachings set forth herein can be transferred to other applications by those skilled in the pertinent art.

Figure 1:
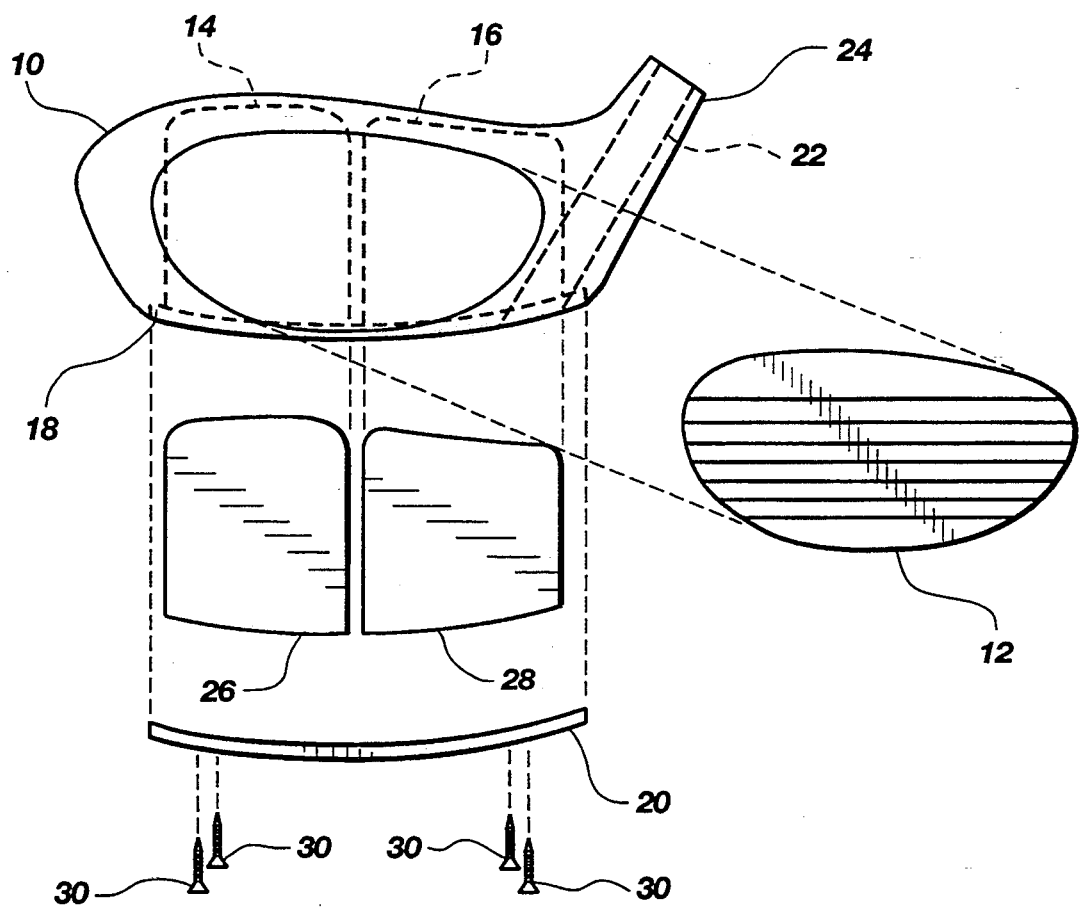
FIG. 1 is an exploded front elevational view of the preferred golf club head of the present invention.
Figure 2:
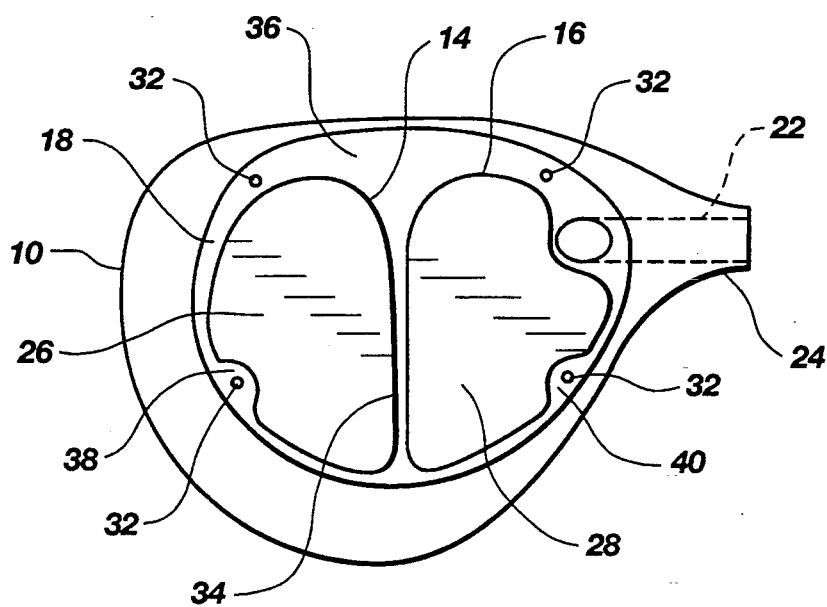
FIG. 2 is a bottom view of the golf club head illustrated in FIG. 1.

Reference will first be made to FIGS. 1 and 2 which show a typical golf club head embodiment of the present invention. It will be understood that the golf club head represented in the figures is merely exemplary and other arrangements for a golf club head, for example different shapes, can be fabricated in accordance with the present invention. While a "wood" golf club head is represented in the figures, fiber reinforced materials can be used to fabricate both "iron" and "wood" golf club heads.

Represented in FIGS. 1 and 2 is a golf club head shell 10. FIG. 1 illustrates the golf club head shell 10 with several components parts exploded therefrom. The golf club head 10 is preferably formed by injection molding of a material which will be described in detail shortly. It is, however, within the scope of the present invention to fabricate the golf club head shell 10 using other techniques.

The golf club head shell 10 is preferably molded so that the edges of a face plate 12 are encapsulated. Two cavities, represented by dotted lines 14 and 16, are formed in the interior of the golf club head shell 10. The cavities 14 and 16 are formed with openings on the bottom of the golf club head shell 10. A sole plate recess 18 is formed into the bottom of the golf club head shell 10. The depth and dimensions of the sole plate recess 18 are matched to those of a sole plate 20. The sole plate 20 is preferably fabricated from aluminum, brass, or other material which is known in the art.

A cylindrical cavity 22 is molded into a hosel 24 on the golf club head 10. The cylindrical cavity 22 has a diameter which is compatible with receiving a standard golf club shaft (not represented in the figures). A pair of flexible foam blocks 26 and 28, which are each made slightly larger than the cavities 14 and 16, are fitted into the cavities 14 and 16 and are kept in place by the sole plate 20 once it is installed. By sizing the flexible foam blocks slightly larger than the cavities 14 and 16, when the sole plate 20 is installed the blocks 26 and 28 are compressed slightly to ensure tight contact with the walls of the cavities 14 and 16.

Four screws, each labeled 30, are used to attach the sole plate 20 to the golf club head shell 10. The screws 30 are preferably fabricated from brass as is known in the industry. The screws 30 are inserted through holes (not illustrated) provided in the sole plate 20 and engage molded holes (32 in FIG. 2) provided in the bottom of the golf club head shell 10. Alternatively, the sole plate 20 can be adhesively bonded to the golf club head shell 10. Still further, both screws 30 and an adhesive can be used. Even further, studs (not illustrated), welded to the sole plate 20 can be used in place of screws 30. The sole plate 20 should fit flush into the recess 18 as is known in the art.

Referring more specifically to FIG. 2, a bridge 34 is provided between the cavities 14 and 16 even with the plane which will be even with the sole plate 20 once installed. The bridge 34 provides an additional area for bonding between the golf club head shell 10 and the sole plate 20. The position of the bridge 34, where it is located at approximately the midpoint of the installed sole plate 20, reduces the unsupported span of the sole plate approximately in half thus providing a stronger structure.

Having explained the preferred general structure of the golf club head embodiment of the present invention, the crucial characteristics of the materials used to form the golf club head shell 10, and other components as will be explained or understood, will now be explained. The preferred material for use with the present invention is referred to herein as long fiber reinforced thermoplastic (which may be referred to as LFRTP).

The long fiber reinforced thermoplastic material described herein is particularly suited for use in fabricating golf club heads because of its three-dimensional strength and three-dimensional stiffness, which has heretofore been unrecognized as important in the art. The long fiber reinforced thermoplastic material is similar to other materials in numerous ways but is different in the characteristics which provide the great advantage of high strength and high stiffness in a plurality of planes/directions.

Short fiber, in contrast to long fiber, injection molding materials have been used previously to fabricate injection molded golf club heads. Short fiber injection molding materials are prepared by heating a thermoplastic resin mixed with chopped fibers until the resin is melted and then the mixture is shear mixed together until thoroughly blended. The mixing breaks the fibers (which may have been long when they were first added to the thermoplastic resin) repeatedly until the average length of the fibers is much less than prior to mixing. The mixture of fibers and thermoplastic resin is then formed into pellets. The pellets are then supplied to the injection molder who will fabricate the final product. Injection molding devices generally use a screw-type injection system which further breaks and shortens the fibers which have been mixed with the thermoplastic resin. In the prior injection molded golf club heads, the final product exhibits a typical average fiber length of from 0.2 mm to 0.3 mm.

In contrast, the long fiber reinforced thermoplastic material used in the present invention is preferably prepared by melting the thermoplastic resin and applying the melted resin to continuous yarns of fiber by methods known in the art such as pressurized pultrusion, fluidized bed coating, and wire coating. The plastic-impregnated yarns are then chopped to the desired lengths. Thus, in the long fiber reinforced thermoplastic materials of the present invention the fibers are generally the same length as the pellet, which in turn, can be cut to any desired length.

In accordance with the present invention, the long fiber reinforced thermoplastic material used in accordance with the present invention can preferably be injection molded using an injection molding device having a screw-type injection system. Other molding techniques can also be used in accordance with the present invention. When a screw-type injection system is used, the fibers will be broken into segments shorter than those delivered in the pellets but since the mixing step used with the previous materials was avoided, the average fiber length in the finished golf club head, for example at least about four millimeters, is typically ten times that which results when the material has been subjected to mixing prior to being formed into pellets.

Important to the advantages provided by the present invention is the characteristic that when long fiber reinforced thermoplastic material is injected into a mold, preferably one forming structures having at least a minimum thickness, the long fibers become entangled with each other. In contrast, as explained earlier, short fiber compounds do not become entangled, but the fibers become aligned in the direction of the material flow in the mold. Thus, with short fiber material, strength and stiffness are maximized only in the direction of material flow during molding (typically along the mold cavity walls) and strength and stiffness is low in other directions/planes. Entangled fibers, conversely, provide increased strength and stiffness in a direction perpendicular to the flow of the material in the mold without reducing strength and stiffness in the direction of the flow within the mold.

It will be appreciated that the term "entangled," as used herein, means that a portion of the fibers found within the long fiber reinforced thermoplastic material overlap each other to some extent. In some cases, the entanglement may be random and chaotic while in other cases the entanglement may be ordered, or some combination of both.

The preferred plastic component of the long fiber reinforced thermoplastic material is one which is a tough, non-brittle thermoplastic such as, for example, polyamide, copolyester, or polycarbonate. The preferred fiber component of the long fiber reinforced thermoplastic material is a high modulus, high strength, low density fiber such as, for example, carbon fiber. The preferred length of the pellets, and hence the length of the fibers in the pellets, is about from 0.8 cm to about 1.2 cm. It will be appreciated that when injection molding techniques are used, they should be evaluated to make sure that the fibers are maintained as long as possible to maintain the advantages of the present invention.

Referring to FIGS. 1 and 2, the foam blocks 26 and 28 are preferably fabricated from a resilient thermoplastic material such as polyethylene which will not shrink or become brittle over time. The use of a thermoplastic foam material is in contrast to the prior practice of using a thermoset foam material. The use of a thermoplastic foam provides advantages not previously available and which will be apparent to those familiar with the characteristics of thermoplastic foams and the teachings set forth herein. It is preferred that the foam blocks 26 and 28 be preshaped and then inserted into the cavities 14 and 16, respectively. The use of preshaped foam blocks 26 and 28 is not taught in the previously known techniques and provides advantages not otherwise obtainable.

An advantage of the golf club head shell 10 of the present invention is that its multi-directional strength and stiffness, enhanced by a thick face plate backing portion indicated at 36 in FIG. 2, allows use of a face plate 12 which is not itself structurally strong enough to withstand the repeated impact of the golf club head hitting a golf ball. Thus, advantageously, non-structural, or semi-structural, materials can be used to fabricate the face plate 12.

The strength and stiffness of the golf club head shell 10 limits any deformation of face plate 12 which allows materials to be used which could not otherwise function as the face plate 12. Ceramic face plates have been used in prior golf club heads. While ceramic face plates are desirable because their high hardness results in the ball being hit farther, ceramic materials are brittle and must be fully supported from behind or they will tend to fracture upon impact with a golf ball. Thus, prior ceramic face plates have been undesirably thick to avoid fracturing.

Advantageously, the golf club head of the present invention allows the face plate 12 to be fabricated from a ceramic material and be larger and/or thinner than possible with previous techniques. With the face plate 12 being fully supported by the material of the golf club head shell 10 having high multi-directional strength and stiffness, a thin ceramic face plate can be used. Alternatively, a very thin face plate fabricated from fiber reinforced plastic could be utilized. For example, a fiber reinforced material which incorporates a woven fiber fabric is aesthetically desirable but producing a thick face plate of such a material can be prohibitively expensive. Since thin face plates can be used, more expensive, non-structural and/or aesthetically desirable materials can be considered for use as face plates.

Those skilled in the art will appreciate that the present invention allows the advantages of injection molding techniques to be gained while providing a finished product with multi-directional high strength and rigidity which heretofore has not been obtained. As known in the art, injection molding techniques provide the advantages of, among others, low labor cost and rapid production rates. Moreover, injection molding of the structure of the present invention allows the structure to be shaped with few restrictions. For example, molded holes 32 are positioned into a thick backing portion 36 and bulge portions 38 and 40 of the golf club head shell 10 all of which can be readily formed using injection molding techniques. The resulting molded holes 32 provide screws 30 with extra gripping strength when compared to typical prior fiber reinforced thin wall structures. The bridge 34 (FIG. 2) can be readily formed by injection molding techniques.

Referring next to FIG. 3 which shows a cavity mold 42 in which the golf club head shell 10 illustrated in FIGS. 1 and 2 is molded. The entire mold 42 is made up of four pieces: a two piece split cavity mold 42 (comprising front and rear halves with only the front half being explicitly shown in FIG. 3) which forms the exterior shape of the golf club head shell; a shaft cavity plunger (or core) 44; and, a sole plate dual cavity plunger (or core) 46. As indicated by upward directed arrows included in FIG. 3 and as shown in FIG. 4, the sole plate dual cavity plunger 46 moves into the split cavity mold 42 during the injection molding process to form the cavities 14 and 16 into which the foam blocks 26 and 28 are placed.

The sole plate dual cavity plunger 46 includes slots 48 and 50 into which face plate positioners 52 and 54, respectively, are inserted. The face plate positioners 52 and 54 are separately formed, preferably of the same long fiber reinforced thermoplastic material as the golf club head shell 10 using an injection molding technique, prior to being inserted in the slots 48 and 50.

Referring to FIG. 4, the action of the sole plate dual cavity plunger 46 can been seen in a cross sectional view. Also represented in FIG. 4 is a face plate 12 in position in the split cavity mold 42. The shaft cavity plunger 44 is also represented as being inserted into the split cavity mold 42 in FIG. 4. The face plate positioners 52 and 54 are provided with a forward edge contour which matches the contour of the back side of the face plate 12.

With the shaft cavity plunger 44 and the sole plate dual cavity plunger 46 in the positions represented in FIG. 4, injection of the long fiber reinforced thermoplastic material into the mold occurs. As the injection proceeds, the long fiber reinforced thermoplastic material flows around the shaft cavity plunger 44, the sole plate dual cavity plunger 46, and the face plate positioners 52 and 54. The face plate positioners 52 and 54 become embedded and integral with the long fiber reinforced thermoplastic material. As the sole plate dual cavity plunger 46 and the shaft cavity plunger 44 are withdrawn, their respective cavities remain in the material and also leave the face plate positioners 52 and 54 integrally formed with the golf club head shell 10 (FIGS. 1 and 2).

Reference will next be made to FIG. 5. FIG. 5 provides a cross sectional view of the face plate positioner 54 taken along line 5—5 of FIG. 3. The face plate positioner 54 is inserted into the slot 50 of the sole plate dual cavity plunger 46 prior to injection of the long fiber reinforced thermoplastic material. The configuration of the slots 48 and 50 is such that the face plate positioners 52 and 54 slide out of the slots 48 and 50, respectively, when the sole plate dual cavity plunger 46 is withdrawn from the split cavity mold 42.

The preferred arrangement using the described face plate positioners 52 and 54 provides advantages not otherwise obtainable. For example, alternative approaches for positioning the face plate 12 are less desirable. One alternative approach requires the geometry of the golf club head shell 10 to be changed to allow the sole plate dual cavity plunger 46 to pin the face plate 12 to the split cavity mold 42 itself. The change in golf club head geometry would result in a poor golf head design, a drawback which is avoided using the described arrangement. Another alternative requires that pins be placed in the split cavity mold 42 to position the face plate 12. Disadvantageously, such pins would become embedded in the molded long fiber reinforced thermoplastic material. Also, pins would be typically metal and undesirably heavy. In still another alternative, a core could be inserted into the split cavity mold 42 which would be shaped and located so as to hold in position the face plate 12 against the split cavity mold 42. Undesirably, this leaves a "hole" in the molded golf club head shell 10 filled with non-structural material at a critical location.

While these described alternatives are less desirable than the arrangement represented in FIGS. 3–5, it is within the scope of the present invention to utilize these, as well as other, techniques. As mentioned earlier, light weight face plates made from long fiber reinforced thermoplastic material can also be used. Such face plates will become unified with the long fiber reinforced thermoplastic material which is injected during the molding process thus adding to its structural properties.

Referring next to FIG. 6, a window 56, which is separately molded from a clear and tough plastic, is inserted into a hole 58 provided in the sole plate 20 as indicated by the arrow. A top plan view of the window 56 is provided in FIG. 7 and taken along line 7—7 in FIG. 6. The preferred material for the window 56 is a thermoplastic material selected from the co-polyester family but other thermoplastic and thermoset materials can be used.

The window 56 is preferably bonded into place, using an adhesive known in the art, on the sole plate 20 prior to the sole plate 20 being installed into the golf club head shell 10 using screws 30 (see FIG. 1). After the sole plate 20 is installed on the golf club head shell, the window 56 can be sanded and any desired finishing coat applied. Using this described arrangement, when a golf shaft (not illustrated in the figures) is adhesively bonded into the golf club head shell 10, the end of the golf shaft will be visible through the window 56. Thus, in contrast to the prior techniques, the desirable characteristic of viewing the end of the golf shaft is obtained without requiring any labor intensive refinishing work after the golf shaft is installed in the golf club head shell 10.

In view of the foregoing, it will be appreciated that the present invention provides fiber reinforced plastic sporting goods, and particularly a golf club head, possessing strength in a plurality of planes or directions and which withstands breakage and fracture even during extensive and hard use. The present invention also provides a fiber reinforced plastic golf club head which is fabricated from a tough material which will not fail during use and which can be injection molded. The present invention also provides a fiber reinforced plastic golf club head wherein non-structural and semi-structure inserts can be inserted into the face of the golf club head and which allows easy assembly of golf club heads and golf club shafts and which sounds like solid wood when hitting a golf ball but which is long lasting and free from rattles and undesirable noises.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A golf club head having a striking surface which receives the force of a golf ball struck by the golf club head when the golf club head is swung, the golf club head comprising:
   a thermoplastic material molded in the general shape of at least part of the sporting goods article;
   a first plurality of reinforcement fibers dispersed in the thermoplastic material, substantially all of the reinforcement fibers having a length of at least about four millimeters, the first plurality of reinforcement fibers being oriented in a first direction, the first direction being substantially perpendicular to the striking surface; and
   a second plurality of reinforcement fibers dispersed in the thermoplastic material, substantially all of the reinforcement fibers each having a length of at least about four millimeters, the second plurality of reinforcement fibers being oriented in a second direction, the second direction being substantially nonperpendicular to the striking surface, the second plurality of reinforcement fibers overlapping the first plurality of reinforcement fibers.

2. A golf club head as defined in claim 1 wherein the thermoplastic material comprises one selected from the group consisting of polyamide, co-polyester, and polycarbonate.

3. A gold club head as defined in claim 1 wherein the sporting goods article comprises a golf club head.

4. A golf club head having a striking face which receives the force of a golf ball struck by the club head, the club head comprising:
   a shell molded in the shape of a golf club head, the shell molded from a thermoplastic material;
   a first plurality of reinforcement fibers dispersed in the thermoplastic material, substantially all of the first plurality of reinforcement fibers having a length of at least about four millimeters, the first plurality of reinforcement fibers being oriented in a first direction, the first direction being substantially perpendicular to the striking face; and
   a second plurality of reinforcement fibers dispersed in the thermoplastic material, substantially all of the second plurality of reinforcement fibers having a length of at least about four millimeters, the second plurality of reinforcement fibers being oriented in a second direction, the second direction being substantially nonperpendicular to the striking face, the second plurality of reinforcement fibers overlapping the first plurality of reinforcement fibers.

5. A golf club head as defined in claim 4 further comprising:
   means for receiving a golf club shaft;
   means for receiving a sole plate; and
   means for receiving a face plate.

6. A golf club head as defined in claim 5 further comprising a fiber reinforced plastic face plate.

7. A golf club head as defined in claim 5 further comprising a ceramic face plate.

8. A golf club head as defined in claim 5 further comprising a metal face plate.

9. A golf club head as defined in claim 4 further comprising face plate positioning means.

10. A golf club head as defined in claim 9 further including a face plate and wherein the face plate positioning means comprises at least one triangular positioner which contacts the face plate on a back side thereof.

11. A golf club head as defined in claim 4 further comprising a bridge formed integrally with the shell and dividing the hollow interior portion into at least first and second portions.

12. A golf club head as defined in claim 4 further comprising a sole plate and wherein the sole plate comprises:
   a hole; and
   a clear window positioned in the hole.

13. A golf club head as defined in claim 4 wherein the thermoplastic material comprises one selected from the group consisting of polyamide, co-polyester, and polycarbonate materials.

14. A golf club head comprising:
   a shell having a hollow interior portion and a face plate portion, the shell fabricated substantially in the exterior shape of golf club head from a thermoplastic material, the shell having a striking surface which receives the force of a golf ball when struck by the golf club head when the golf club head is swung;
   means for receiving a golf club shaft;
   means for receiving a sole plate;
   means for receiving a face plate;
   a sole plate;
   a first plurality of reinforcement fibers dispersed within the thermoplastic material, each one of the first plurality of reinforcement fibers having a length of at least about four millimeters, the first plurality of reinforcement fibers being oriented in a first direction, the first direction being substantially perpendicular to the striking surface; and
   a second plurality of reinforcement fibers dispersed within the thermoplastic material, each one of the second plurality of reinforcement fibers having a length of at least about four millimeters, the second plurality of reinforcement fibers being oriented in directions which are substantially nonperpendicular to the first direction and at least some of the reinforcement fibers of the first plurality of reinforcement fibers and the second plurality of reinforcement fibers being entangled with each other.

15. A golf club head as defined in claim 14 further comprising a plastic insert positioned in the hollow interior portion of the shell.

16. A golf club head as defined in claim 14 further comprising face plate positioning means.

17. A golf club head as defined in claim 16 further comprising a face plate and wherein the face plate positioning means comprises at least one triangular positioner which contacts the face plate on a back side thereof.

18. A golf club head as defined in claim 14 wherein the striking comprises a ceramic face plate.

19. A golf club head as defined in claim 14 wherein the striking surface comprises a metal face plate.

20. A golf club head as defined in claim 14 wherein the striking comprises a fiber reinforced plastic face plate.

21. A golf club head as defined in claim 14 further comprising a bridge formed integrally with the shell and dividing the hollow interior portion into at least first and second portions.

22. A golf club head as defined in claim 14 wherein the sole plate comprises a hole and a clear window positioned in the hole.

23. A golf club head as defined in claim 14 wherein the thermoplastic material comprises one selected from the group consisting of polyamide, co-polyester, and polycarbonate materials.

* * * * *